US010168427B2

(12) United States Patent
Hung et al.

(10) Patent No.: US 10,168,427 B2
(45) Date of Patent: *Jan. 1, 2019

(54) DATA READOUT VIA REFLECTED ULTRASOUND SIGNALS

(71) Applicant: INTERNATIONAL BUSINESS MACHINES CORPORATION, Armonk, NY (US)

(72) Inventors: Li-Wen Hung, Mahopac, NY (US); Reinaldo Vega, Mahopac, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/962,418

(22) Filed: Apr. 25, 2018

(65) Prior Publication Data

US 2018/0239016 A1 Aug. 23, 2018

Related U.S. Application Data

(63) Continuation of application No. 15/156,061, filed on May 16, 2016.

(51) Int. Cl.
| | | |
|---|---|---|
| *G01S 15/04* | (2006.01) | |
| *G01S 15/02* | (2006.01) | |
| *G01S 15/12* | (2006.01) | |
| *G06K 7/10* | (2006.01) | |
| *H04B 11/00* | (2006.01) | |
| *G01S 15/74* | (2006.01) | |

(52) U.S. Cl.
CPC .............. *G01S 15/04* (2013.01); *G01S 15/74* (2013.01); *H04B 11/00* (2013.01)

(58) Field of Classification Search
CPC ...................................................... G01S 15/04
See application file for complete search history.

(56) References Cited

U.S. PATENT DOCUMENTS

| | | | | |
|---|---|---|---|---|
| 3,733,581 A | * | 5/1973 | Kalmus ................ | G01S 15/523 342/28 |
| 4,337,527 A | * | 6/1982 | Delagrange .......... | H03G 3/3015 367/94 |
| 2010/0052972 A1 | * | 3/2010 | Kasano ................. | G01S 15/523 342/28 |
| 2016/0154089 A1 | * | 6/2016 | Altman ............... | G01S 7/52004 367/124 |

OTHER PUBLICATIONS

List of IBM Patents or Patent Applications Treated as Related dated Apr. 25, 2018, 2 pages.

* cited by examiner

*Primary Examiner* — Joseph Feild
*Assistant Examiner* — Pameshanand Mahase
(74) *Attorney, Agent, or Firm* — Tutunjian & Bitetto, P.C.; Erik Johnson

(57) ABSTRACT

A system and method are provided. The system includes a data reader having a processor for performing a signal frequency analysis, an ultrasound transmitter for transmitting ultrasound signals, and an ultrasound receiver for receiving reflected ultrasound signals. The system further includes a movable reflector for receiving the ultrasound signals and reflecting the ultrasounds signals back to the ultrasound receiver (a) as the reflected ultrasound signals without modulation when the movable reflector is stationary and (b) as the reflected ultrasound signals with modulation when the movable reflector is mobile. The system also includes a chip for storing a specification of motion states for the movable reflector.

20 Claims, 4 Drawing Sheets

DATA READOUT VIA REFLECTED
ULTRASOUND SIGNALS

BACKGROUND

Technical Field

The present invention generally relates to data processing, and more particularly to data readout via ultrasound signals.

Description of the Related Art

Sensor nodes or tags on the edge of a network need a low power solution. The wireless data uplink is often one of the most power hungry functions.

One known approach used in sensor nodes involves Radio Frequency (RF) signals. In this approach, a change of capacitance or inductance is detected via resonant frequency change, which is then communicated using an antenna. However, in some applications, the footprint of a tag is too small to accommodate an efficient antenna unless the operating frequency is increased to tens of GHz.

Another disadvantage is that many objects in the sensing environments exhibit variable capacitance and/or inductance. The change of capacitance and/or inductance on the tag has to be larger than incidental changes of those parameters in order to have accurate data readout.

SUMMARY

According to an aspect of the present invention, a system is provided. The system includes a data reader having a processor for performing a signal frequency analysis, an ultrasound transmitter for transmitting ultrasound signals, and an ultrasound receiver for receiving reflected ultrasound signals. The system further includes a movable reflector for receiving the ultrasound signals and reflecting the ultrasounds signals back to the ultrasound receiver (a) as the reflected ultrasound signals without modulation when the movable reflector is stationary and (b) as the reflected ultrasound signals with modulation when the movable reflector is mobile. The system also includes a chip for storing a specification of motion states for the movable reflector.

According to another aspect of the present invention, a method is provided. The method includes configuring a data reader, having an ultrasound transmitter, an ultrasound receiver, and a processor, to respectively transmit ultrasound signals using the ultrasound transmitter, receive reflected ultrasound signals using the ultrasound receiver, and perform a signal frequency analysis using the processor. The method further includes configuring a movable reflector to receive the ultrasound signals and reflect the ultrasounds signals back to the ultrasound receiver (a) as the reflected ultrasound signals without modulation when the movable reflector is stationary and (b) as the reflected ultrasound signals with modulation when the movable reflector is mobile. The method also includes configuring a chip to store a specification of motion states for the movable reflector.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION

The present principles are directed to data readout via reflected ultrasound signals.

In an embodiment, a data readout scheme is disclosed that involves a data reader and a chip that includes/stores data which is intended to be readable by the data reader. The chip does not transmit a signal out. The data reader includes an ultrasound transmitter and an ultrasound receiver. The data reader transmits ultrasound signals, receives reflected ultrasound signals, and performs a frequency analysis on the reflected ultrasound signals. The chip includes a movable reflector. The movable reflector reflects the transmitted ultrasonic signals back to the data reader and, by doing so, modulates the signals. The data reader transmits ultrasound signals with a specific frequency fo. If the movable reflector is moving, then the ultrasound receiver on the data reader will receive signals of the original frequency fo plus a modulated frequency. This modulated frequency is a function of the speed of the movable reflector. If the movable reflector is not moving, then the receiver will receive only the specific frequency fo. Depending on the frequency content in the received signal, the data reader can determine through the frequency analysis if the data is a "0" or a "1". In some cases, the chip has to be synchronized with the data reader. Synchronization can be achieved via optical or ultrasound methods, as is readily appreciated by one of ordinary skill in the art.

Figure 1:
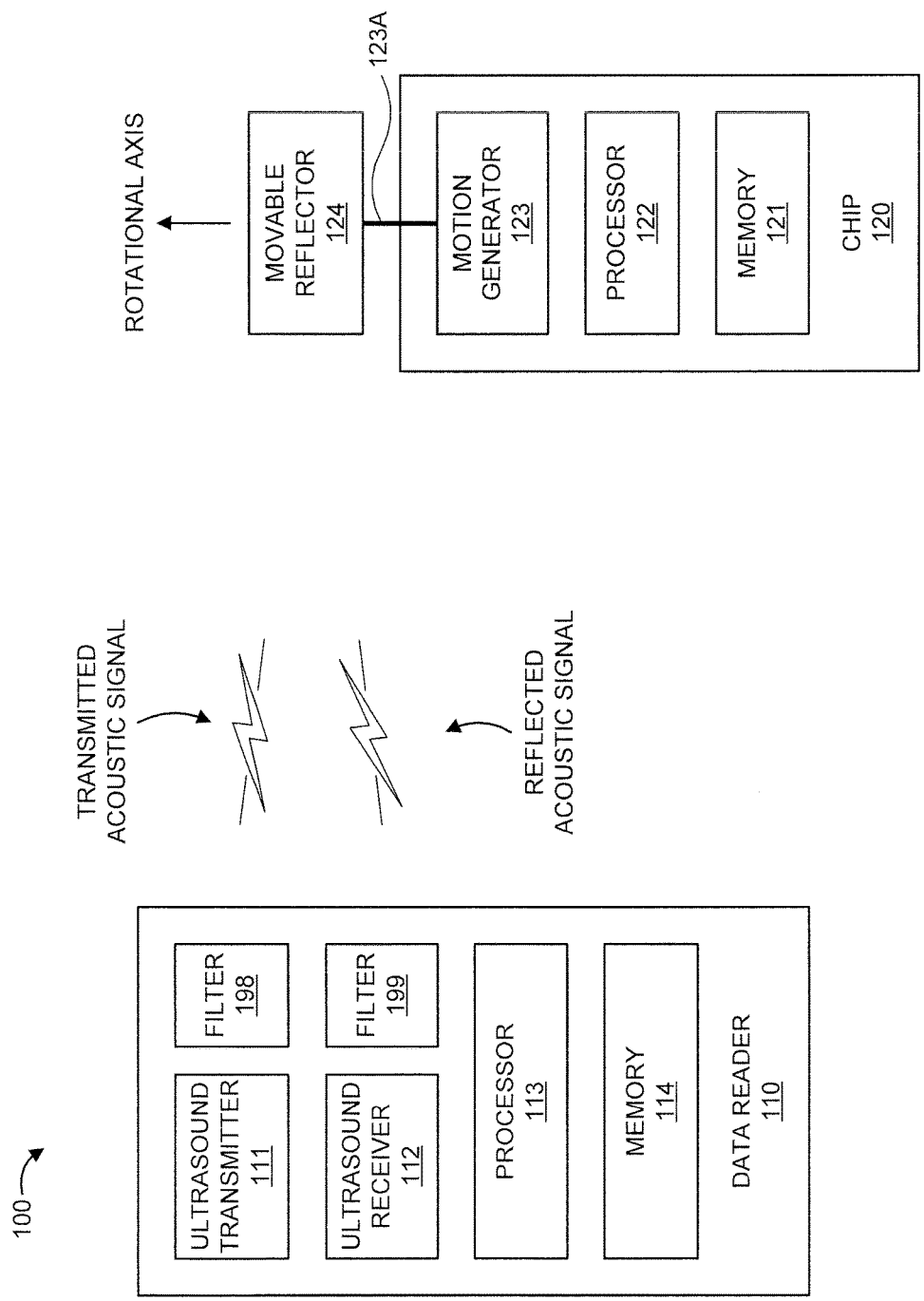
FIG. 1 shows an exemplary data readout system that uses reflected ultrasound signals, in accordance with an embodiment of the present principles.

FIG. 1 shows an exemplary data readout system 100 that uses reflected ultrasound signals, in accordance with an embodiment of the present principles.

The data readout system 100 includes a data reader 110 and a chip 120.

The data reader 110 includes an ultrasound transmitter 111, an ultrasound receiver 112, a processor 113, and a memory 114.

The chip 120 includes a memory 121, a processor 122, a motion generator 123, and a movable diaphragm/reflector (hereinafter "movable reflector") 124. While in the embodiment of FIG. 1 the chip 120 contains the memory 121, processor 122, at least part of the motion generator 123 can be external to the chip 120 and part or all of the movable reflector 124 can be external to the chip 120. In an embodiment, the movable reflector 124 is suspended to readily allow motion thereof. Of course, other structural configurations of the movable reflector 124 can also be used in accordance with the teachings of the present principles, while maintaining the spirit of the present principles.

The memory 121 stores data for an item to which the chip is attached to and/or otherwise associated with. The data is stored in the form of a specification for a set of motion states to be exhibited by the movable reflector 124, where the motion states implicitly indicate data values (0 or 1) that are readable by the data reader 110. The specification can include one or more signal driver specifications to be used to drive the motion of the movable reflector 124 and/or other types of specifications in order to impart motion to the movable reflector 124 where such motion is used to represent data values.

The motion generator 123 imparts motion to the movable reflector 124. The motion generator 123 can impart such motion to the movable reflector 124 using a mechanical-based approach, an electrical-based approach, or a combination of the preceding, as well as other approaches as readily appreciated by one of ordinary skill in the art. The motion generator 123 is controlled by the processor 122. The processor 122 includes signal generation capabilities. Alternatively, the chip 120 could include a separate signal generator for generating signals for use by the motion generator 123 in creating motion in the movable reflector 124. The motion generator 123 can impart oscillating motion or non-oscillating motion to the movable reflector 124. The movable reflector 124 can be driven by a step function or a train of square waves, or can be driven at its resonant frequency (e.g., by a sinusoidal wave). It is to be appreciated that the preceding signal drivers are merely illustrative and, thus, other signal drivers for the movable reflector can also be used, while maintaining the spirit of the present principles. The motion can be continuous or intermittent (e.g., scheduled at certain times), depending upon the implementation.

In an embodiment, the motion generator 123 includes an arm 123A that extends along, and is attached to, a rotational axis of the movable reflector 124.

The ultrasound transmitter 111 of the data reader 110 transmits an ultrasound signal fo with a high Q. In an embodiment, the transmitted ultrasound signal is ideally a delta function involving a single frequency. In an embodiment, a respective ultrasound signal is transmitted for each bit of data to be read by the data reader 110.

If the movable reflector 124 is not moving, then the reflected signal received by the ultrasound receiver 112 has the same frequency fo as the transmitted signal. Conversely, if the movable reflector 124 is moving, then the frequency of the reflected signal received by the ultrasound receiver 112 is modulated with respect to the transmitted signal.

The distance between the data reader 110 and, for example, surrounding objects, will change the amplitude and phase of the received signal, but not the frequency. The frequency of the reflected signals changes only when something is moving, thus employing a "frequency modulation".

The ultrasonic receiver 112 of the data reader 110 receives the reflected signal and the processor 113 of the data reader 110 runs a frequency analysis on the reflected signal. If a modulated frequency component exists, then the data readout is a "1". Otherwise, the data readout is a "0". Of course, other data coding schemes can also be used in accordance with the teachings of the present principles, while maintaining the spirit of the present principles.

One or more filters can be used to enhance the signal-to-noise ratio (SNR). The ultrasound transmitter 111 is connected to a filter 198, and the ultrasound receiver 112 is connected to a filter 199. The ultrasound receiver 112 can be tuned to the modulated frequency.

It is to be appreciated that once the movable reflector 124 has commenced motion, reading of data values from such motion can occur within a midst of the data for the item. That is, if an item is associated with 15 bits of description, where the 15 bits are implicitly decoded based on the motion of the movable reflector 124, reading can at times commence at a location other than the first bit of the description. As such, a start and end marker can be used within the data (e.g., a specific set of bits as a start marker and a specific set of bits as an end marker). In an embodiment, the start and end can be determined from all of decoded data which may have some duplication in the case that reading start within a description and then captures an entire description, thus having bits for the entire description and the extra duplicated bits which, once identified as duplicative, can simply be discarded.

Figure 2:
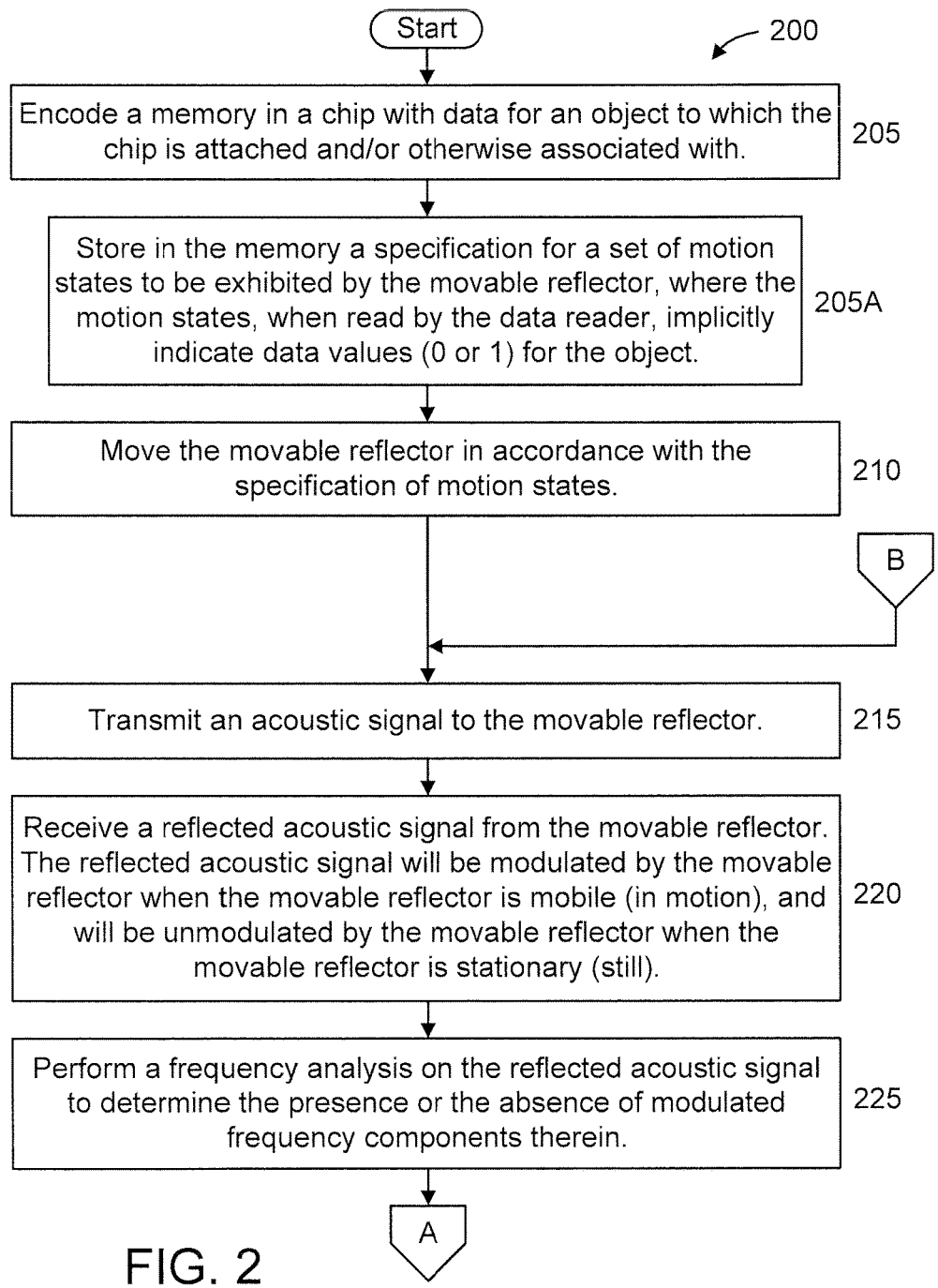
FIGS. 2-3 show an exemplary method for data readout via reflected ultrasound signals, in accordance with an embodiment of the present principles.
Figure 3:
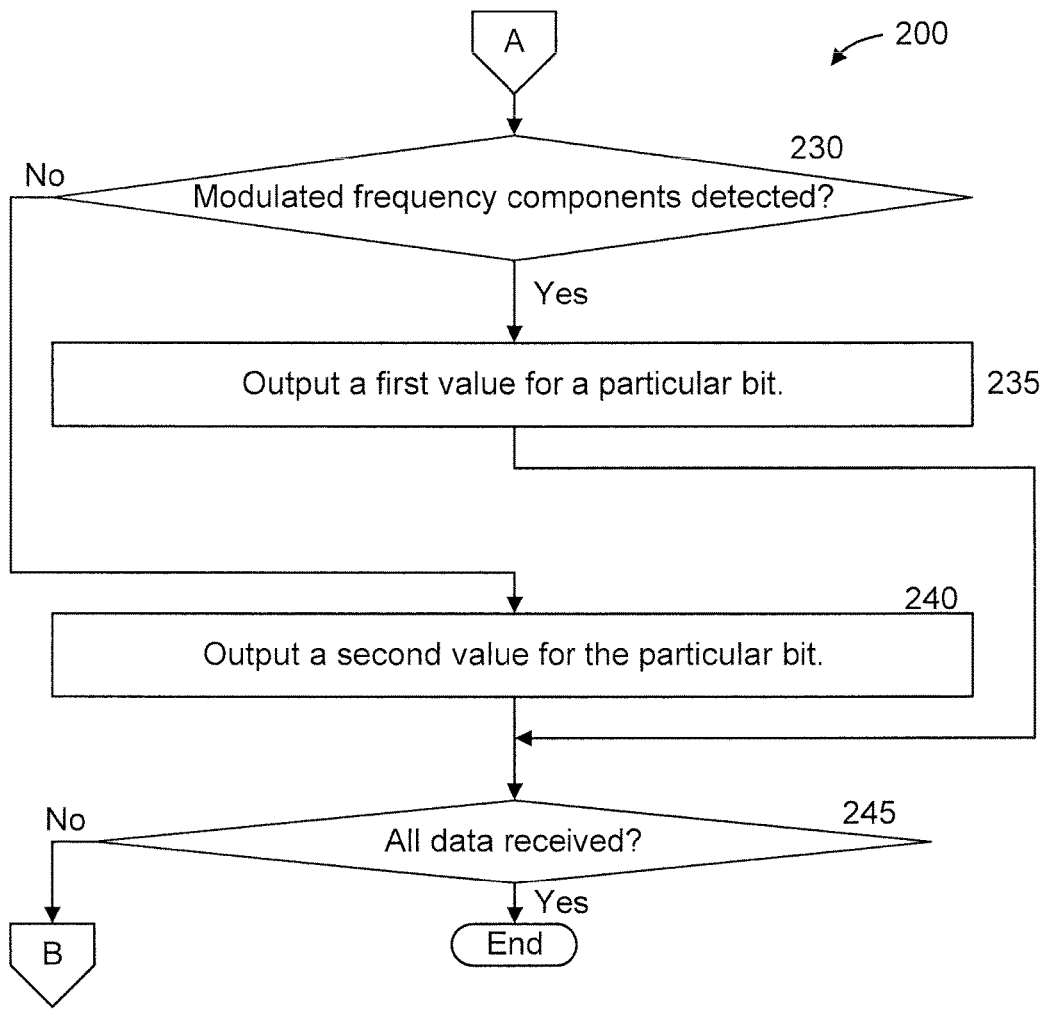

FIGS. 2-3 show an exemplary method 200 for data readout via reflected ultrasound signals, in accordance with an embodiment of the present principles. The method 200 is applied using a data reader and a chip having the movable reflector, e.g., as described above with respect to FIG. 1.

At step 205, encode a memory in a chip with data for an object to which the chip is attached and/or otherwise associated with.

In an embodiment, step 205 includes step 205A.

At step 205A, store in the memory a specification for a set of motion states to be exhibited by the movable reflector, where the motion states, when read by the data reader, implicitly indicate data values (0 or 1) for the object.

At step 210, move the movable reflector in accordance with the specification of motion states.

At step 215, transmit an acoustic signal to the movable reflector.

At step 220, receive a reflected acoustic signal from the movable reflector. The reflected acoustic signal will be modulated by the movable reflector when the movable reflector is mobile (in motion), and will be unmodulated by the movable reflector when the movable reflector is stationary (still).

At step 225, perform a frequency analysis on the reflected acoustic signal to determine the presence or the absence of modulated frequency components therein.

At step 230, determine whether or not the modulated frequency components were detected. If so, then proceed to step 235. Otherwise, proceed to step 240.

At step 235, output a first value for a particular bit (e.g., a "1" bit).

At step 240, output a second value for the particular bit (e.g., a "0" bit).

At step 245, determine if all the data has been received. If so, then terminate the method. Otherwise, then return to step 215 to repeat the method for the next acoustic signal/next bit. In an embodiment, the determination involves determining redundancy in the received data. Of course, other techniques, as readily appreciated by one of ordinary skill in the art, can also be used in accordance with the teachings of the present principles, while maintaining the spirit of the present principles.

Figure 4:
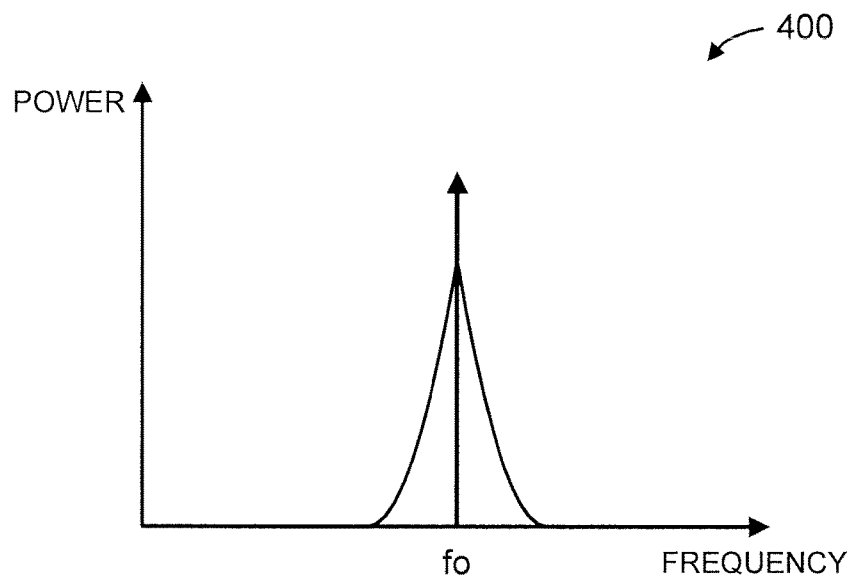
FIG. 4 shows an exemplary plot of power versus frequency for the case when the movable reflector is stationary, in accordance with an embodiment of the present principles.

FIG. 4 shows an exemplary plot 400 of power versus frequency for the case when the movable reflector 124 is stationary, in accordance with an embodiment of the present principles. In such a case (movable reflector 124 is stationary), the data value is equal to zero at around fo.

Figure 5:
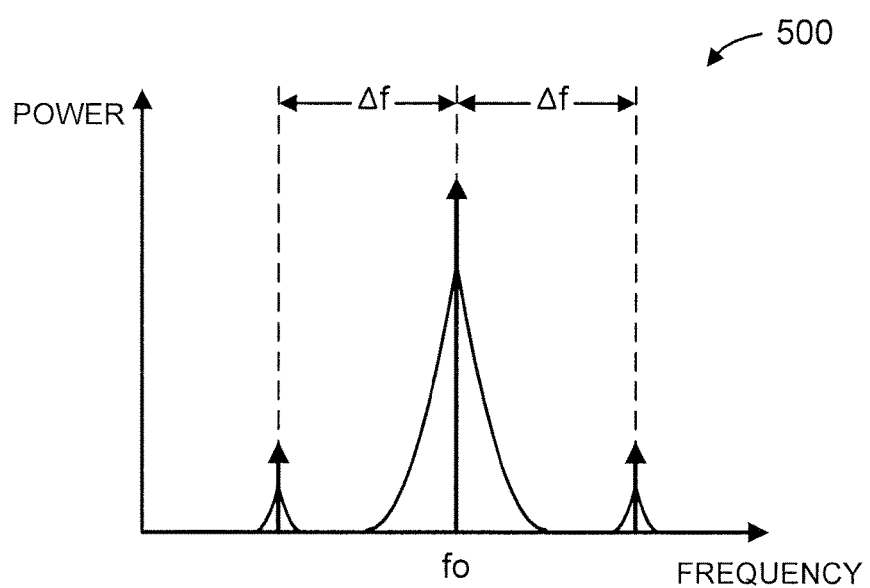
FIG. 5 shows an exemplary plot of power versus frequency for the case when the movable reflector is in motion, in accordance with an embodiment of the present principles.

FIG. 5 shows an exemplary plot 500 of power versus frequency for the case when the movable reflector 124 is in motion, in accordance with an embodiment of the present principles. In such a case (movable reflector 124 is mobile), the data value is equal to one at around fo. The difference between fo and the two component frequencies shown in FIG. 5 are represented by $\Delta f$.

It is to be appreciated that while the situations in FIGS. 4 and 5 respectively correspond to data values of 0 and 1, in another embodiment, these values can be switched. Moreover, in an embodiment, an ultrasound signal can represent more than one bit (e.g., a digital word, etc.).

To have clear distinction of the emitted frequency and the modulated frequency, the Q of the ultrasound transmitter 111 has to be sufficient and the reflector has to move sufficiently fast relative to the sound speed. For example, consider a Q of 1,000 at 10 MHz for the transmitted signal, meaning that half of its energy resides within 9.995 MHz to 10.005 MHz. An oscillating reflector with amplitude of 0.5 um at 10 MHz has a sinusoidal velocity with peak of $2*\pi*10M*0.5$ u=31 m/s. It is to be noted that 31 m/s corresponds to a 20% maximum change in received frequency. For the example, signals can be detected as low as 8 MHz and as high as 12 MHz. A 20% frequency separation is sufficient to achieve a greater than 20 dB rejection with typical filters.

A description will now be given of some of the many attendant advantages of the present principles.

Advantageously, data readout accuracy is less sensitive to environmental variables than prior art approaches, since the data reader is looking for frequency change, and not a phase change or an amplitude change. The frequency only changes when the reflector is moving, while the source (transmitter), the media (air), and the receiver are held still/unchanged. It is to be appreciated that only "sufficiently fast" movement will alter the data readout. The system can be configured to allow some relative movement between the data reader 110 and the chip 120. Such a configuration enables the implementation of a handheld and portable data reader. Hand shaking during operation can thus be tolerated by the system 100. Also, in such a configuration, the system 100 can also be used in environments with background movements such as, for example, but not limited to, in a truck or other vehicle, on an assembly line, and so forth.

Advantageously, implementations of the present principles consume a small amount of power. For example, it takes microwatts or less to oscillate a small reflector/diaphragm at resonance.

Advantageously, the present principles involve a higher signal-to-noise ratio (SNR) than an amplitude based approach. Moreover, an amplitude based approach is difficult for a very small tag, either with RF or optical signals, as the signals reflected back from other objects as noise can overwhelm the target signal (i.e., the noise floor is higher than the signal). Additionally, the "modulation depth" of the amplitude modulation method is sensitive to environmental parameters such as distance and incidental angle.

Advantageously, the present principles are easily implemented in practice. For example, the present principles can be implemented on a chip via a suspended diaphragm/reflector with known and common semiconductor materials and fabrication steps. Moreover, commercially available ultrasonic transmitters, ultrasonic receivers, and/or ultrasonic readers can be used to implement the present principles.

Exemplary applications/uses to which the present principles can be applied include, but are not limited to: object identification (particularly useful if the object is packaged and/or otherwise not readily visible and the chip is placed outside of the packaging); object tracking; sensory network; supply chain management; inventory control; product history management; and so forth.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A system, comprising:
   a data reader having a processor for performing a signal frequency analysis, an ultrasound transmitter for transmitting ultrasound signals, and an ultrasound receiver for receiving reflected ultrasound signals;
   a movable reflector for receiving the ultrasound signals and reflecting the ultrasounds signals back to the ultrasound receiver (a) as the reflected ultrasound signals without modulation when the movable reflector is stationary and (b) as the reflected ultrasound signals with modulation when the movable reflector is mobile; and
   a chip for storing a specification of motion states for the movable reflector.

2. The system of claim 1, wherein the processor outputs a first value or a second value respectively depending upon a detection or a non-detection of modulated frequency components in a received ultrasound signal.

3. The system of claim 2, wherein the first value or the second value correspond to data for an item to which the chip is attached or associated with.

4. The system of claim 3, wherein the first value or the second value is implicitly decoded from the ultrasound signal irrespective of a phase change or an amplitude change between a transmitted ultrasound signal and the received ultrasound signal reflected back in response to the transmitted ultrasound signal.

5. The system of claim 2, wherein the first value and the second value are potential values for a same bit of data for an item to which the chip is attached or associated with.

6. The system of claim 1, wherein the chip further has a motion generator for imparting motion to the movable reflector responsive to the specification of motion states.

7. The system of claim 1, wherein the motion states comprise oscillating motions.

8. The system of claim 1, wherein the motion states comprise non-oscillating motions.

9. The system of claim 1, wherein the movable reflector is driven at a resonant frequency thereof using a sinusoidal voltage.

10. The system of claim 1, wherein the movable reflector is driven using a train of square waves.

11. The system of claim 1, wherein the signal frequency analysis ignores phase and amplitude changes between the ultrasound signals and the reflected ultrasound signals.

12. A method, comprising:
configuring a data reader, having an ultrasound transmitter, an ultrasound receiver, and a processor, to respectively transmit ultrasound signals using the ultrasound transmitter, receive reflected ultrasound signals using the ultrasound receiver, and perform a signal frequency analysis using the processor;
configuring a movable reflector to receive the ultrasound signals and reflect the ultrasounds signals back to the ultrasound receiver (a) as the reflected ultrasound signals without modulation when the movable reflector is stationary and (b) as the reflected ultrasound signals with modulation when the movable reflector is mobile; and
configuring a chip to store a specification of motion states for the movable reflector.

13. The method of claim 12, outputting, by the processor, a first value or a second value respectively depending upon a detection or a non-detection of modulated frequency components in a received ultrasound signal.

14. The method of claim 13, wherein the first value or the second value correspond to data for an item to which the chip is attached or associated with.

15. The method of claim 14, wherein the first value or the second value is implicitly decoded from the ultrasound signal irrespective of a phase change or an amplitude change between a transmitted ultrasound signal and the received ultrasound signal reflected back in response to the transmitted ultrasound signal.

16. The method of claim 13, wherein the first value and the second value are potential values for a same bit of data for an item to which the chip is attached or associated with.

17. The method of claim 12, imparting, by a motion generator connected to the chip, motion to the movable reflector responsive to the specification of motion states.

18. The method of claim 12, wherein the movable reflector is driven at a resonant frequency thereof using a sinusoidal voltage.

19. The method of claim 12, wherein the movable reflector is driven using a train of square waves.

20. A non-transitory article of manufacture tangibly embodying a computer readable program which when executed causes a computer to perform the steps of claim 12.

* * * * *